United States Patent Office 2,884,455
Patented Apr. 28, 1959

2,884,455

PROPYNYL PHENYLETHYLAMINES AND THEIR HALOGEN ACID SALTS

Dale N. Robertson and Maynard B. Chenoweth, Midland, Mich., assignors to The Dow Chemical Company, Midland, Mich., a corporation of Delaware No Drawing. Application October 29, 1956
Serial No. 618,694

4 Claims. (Cl. 260—570.8)

This invention is concerned with the propynyl phenylethylamines of the formula

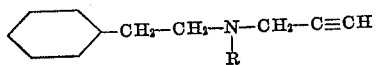

wherein R represents hydrogen or propynyl, and the halogen acid salts of these amines. N-(2-propynyl)-phenylethylamine and N,N-di(2-propynyl) phenylethylamine are viscous liquids somewhat soluble in many organic solvents and of low solubility in water, whereas the corresponding hydrobromides and hydrochlorides are crystalline solids which are soluble in water and of low solubility in organic solvents. The amines and their halogen acid or hydrogen halide salts have been found to be active as plant growth control materials and are adapted to be employed as active toxic constituents in dust and liquid compositions for the control of the growth and the killing of weeds and for the sterilization of soil with regard to plant growth. They are also useful as parasiticides for the control of fungal organisms such as *Alternaria solani*.

N-(2-propynyl) phenylethylamine may be prepared by the reaction of phenylethylamine with propargyl bromide or propargyl chloride. The reaction is carried out in an inert organic solvent such as carbon tetrachloride, chloroform, methylene chloride or benzene. The reaction is somewhat exothermic and takes place smoothly at temperatures of from −10° to 90° C. with the formation of the desired product and phenylethylamine hydrobromide or hydrochloride of reaction. The temperature may be controlled by regulating the rate of contacting the reactants and by external cooling. Good results are obtained when employing at least two molecular proportions of phenylethylamine with each molecular proportion of propargyl halide.

In carrying out the reaction, the propargyl halide is added portionwise to the phenylethylamine dispersed in the reaction solvent. If desired, the order of addition of the reactants may be reversed. In either case, the addition is carried out with stirring and at a temperature of from −10° to 90° C. Upon completion of the reaction, the solid phenylethylamine hydrohalide formed as a by-product is removed by filtration and the filtrate washed with water and dried. The solvent is thereafter removed by distillation and the residue fractionally distilled under reduced pressure to obtain the desired product as a colorless liquid.

N,N-di(2-propynyl) phenylethylamine and N-(2-propynyl) phenylethylamine hydrobromide are prepared by the reaction of N-(2-propynyl) phenylethylamine with propargyl bromide. The reaction is carried out in an inert organic solvent and within the temperature range of from −10° to 90° C., and in the manner previously described for the preparation of N-(2-propynyl) phenylethylamine. Good results are obtained when employing one-half molecular proportion of propargyl bromide with each molecular proportion of N-(2-propynyl) phenylethylamine. The reaction takes place readily with the production of the N-(2-propynyl) phenylethylamine hydrobromide which precipitates as a crystalline solid in the reaction mixture, and the N,N-di(2-propynyl) phenylethylamine. Upon completion of the reaction, the solid N-(2-propynyl) phenylethylamine hydrobromide is removed by filtration and purified by crystallization from a suitable organic solvent such as ethanol. The filtrate which contains the N,N-di(2-propynyl) phenylethylamine is washed with water and thereafter fractionally distilled under reduced pressure to separate the amine as a liquid.

N,N-di(2-propynyl) phenylethylamine hydrochloride may be prepared by dissolving N,N-di(2-propynyl) phenylethylamine in absolute methanol or ethanol and neutralizing the resulting solution with hydrochloric acid at about room temperature. During the neutralization, the desired hydrochloride salt may precipitate in the reaction mixture as a crystalline solid which may be separated by filtration. If the salt does not precipitate, the solvent may be removed by evaporation and the solid residue recrystallized from a suitable organic solvent to obtain the purified hydrochloride salt.

The following examples illustrate the invention but are not to be construed as limiting:

*Example 1.—N-(2-propynyl) phenylethylamine*

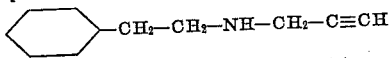

Propargyl bromide in the amount of 24 grams (0.21 mole) was added portionwise to 48.2 grams (0.40 mole) of phenylethylamine dispersed in 200 milliliters of methylene chloride. The addition was carried out with stirring and at room temperature. During the addition the resulting mixture warmed spontaneously to the boiling point of the solvent (42° C.). As boiling began, the phenylethylamine hydrobromide of reaction precipitated as a white solid. The mixture was allowed to stand overnight before removing the amine hydrobromide by filtration. The filtrate was then washed with water and dried over anhydrous magnesium sulfate. Upon removal of the solvent and distillation of the residue under reduced pressure, there was obtained an N-(2-propynyl) phenylethylamine product as a colorless liquid boiling at 70° C. at 0.1 millimeter pressure. This product assayed 99.05 percent by potentiometric titration with hydrochloric acid and had a refractive index n/D of 1.5325 at 25° C.

*Example 2.—N-(2-propynyl) phenylethylamine hydrobromide*

Propargyl bromide (0.25 mole) was added portionwise to 0.5 mole of N-(2-propynyl) phenylethylamine dissolved in 200 milliliters of methylene chloride. The addition was carried out with stirring and at room temperature. Heat was generated by the reaction which ensued. Upon standing overnight, an N-(2-propynyl) phenylethylamine hydrobromide product precipitated in the reaction mixture as a white solid. This product was separated by filtration and repeatedly recrystallized from absolute ethanol. The recrystallized product melted at 191°–191.5° C.

*Example 3.—N,N-di(2-propynyl) phenylethylamine hydrochloride*

The filtrate obtained in Example 2 was washed with water and the methylene chloride evaporated to obtain an N,N-di(2-propynyl) phenylethylamine product as a liquid residue. N,N-di(2-propynyl) phenylethylamine has a molecular weight of 197. The N,N-di(2-propynyl) phenylethylamine product was thereafter dissolved in absolute methanol and neutralized with concentrated hydrochloric acid. Upon evaporation of the solvent, the residue was crystallized from ethanol to obtain an N,N-di(2-propynyl) phenylethylamine hydrochloride product as a crystalline solid melting at 168°–169° C.

The new compounds of the present invention are effective as herbicides for the killing of weeds and the sterilization of soil with regard to plant growth. They are also effective as fungicides and are adapted to be employed for the control of such fungal organisms as *Alternaria solani*. For such use the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents in oil-in-water emulsions or aqueous dispersions with or without the addition of wetting, dispersing or emulsifying agents. In representative operations, good controls of the growth of the seeds and emerging seedlings of millet and wild oats have been obtained with N,N-di(2-propynyl) phenylethylamine hydrochloride when applied at the rate of 50 pounds per acre to soil previously planted with said plant species.

We claim:
1. A propynyl phenylethylamine having the formula

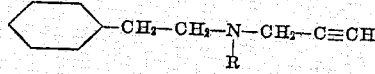

in which R is selected from the group consisting of hydrogen and propynyl, and its halogen acid salts.
2. N-(2-propynyl) phenylethylamine.
3. N,N-di(2-propynyl) phenylethylamine hydrochloride.
4. N-(2-propynyl) phenylethylamine hydrobromide.

References Cited in the file of this patent
UNITED STATES PATENTS
2,613,208   Van Hook et al. -------- Oct. 7, 1952